Nov. 28, 1967    D. DOUGLAS    3,355,045
INSULATED BEVERAGE SERVER
Filed Oct. 24, 1965    2 Sheets-Sheet 2
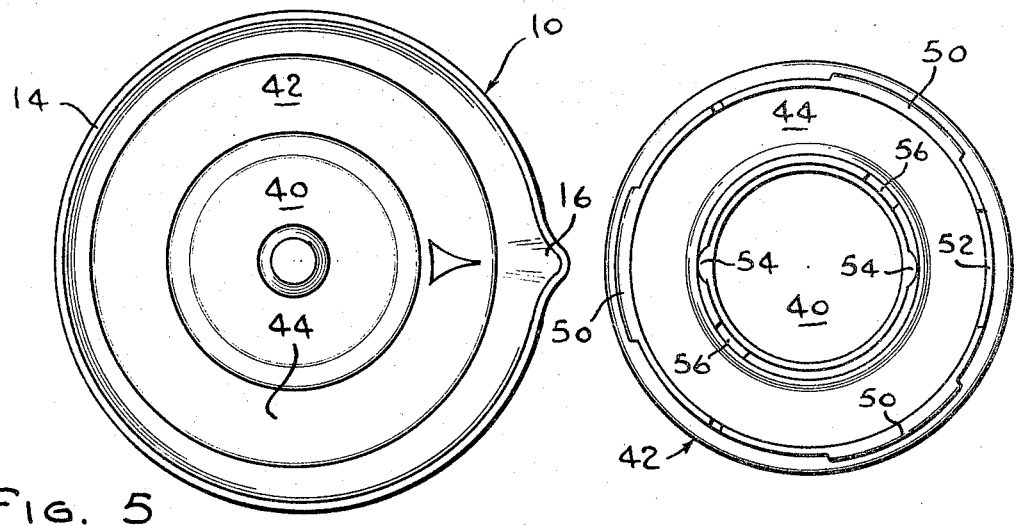
FIG. 5
FIG. 8
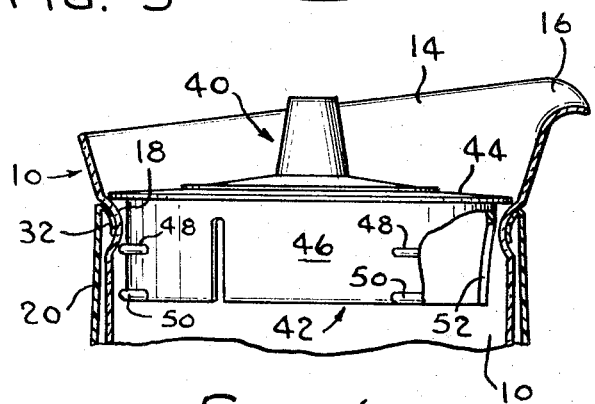
FIG. 6
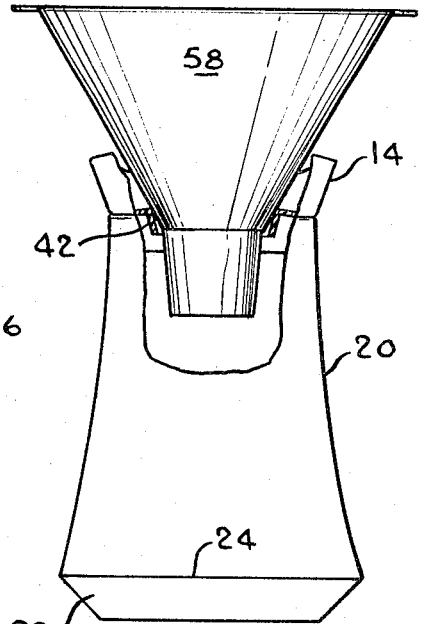
FIG. 9
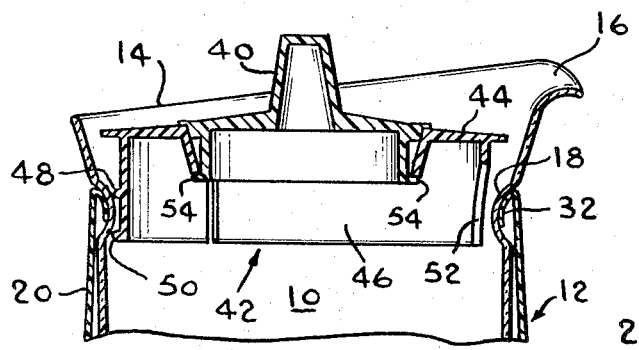
FIG. 7
INVENTOR
DAVID DOUGLAS
Paul R. Puerner
ATTORNEY

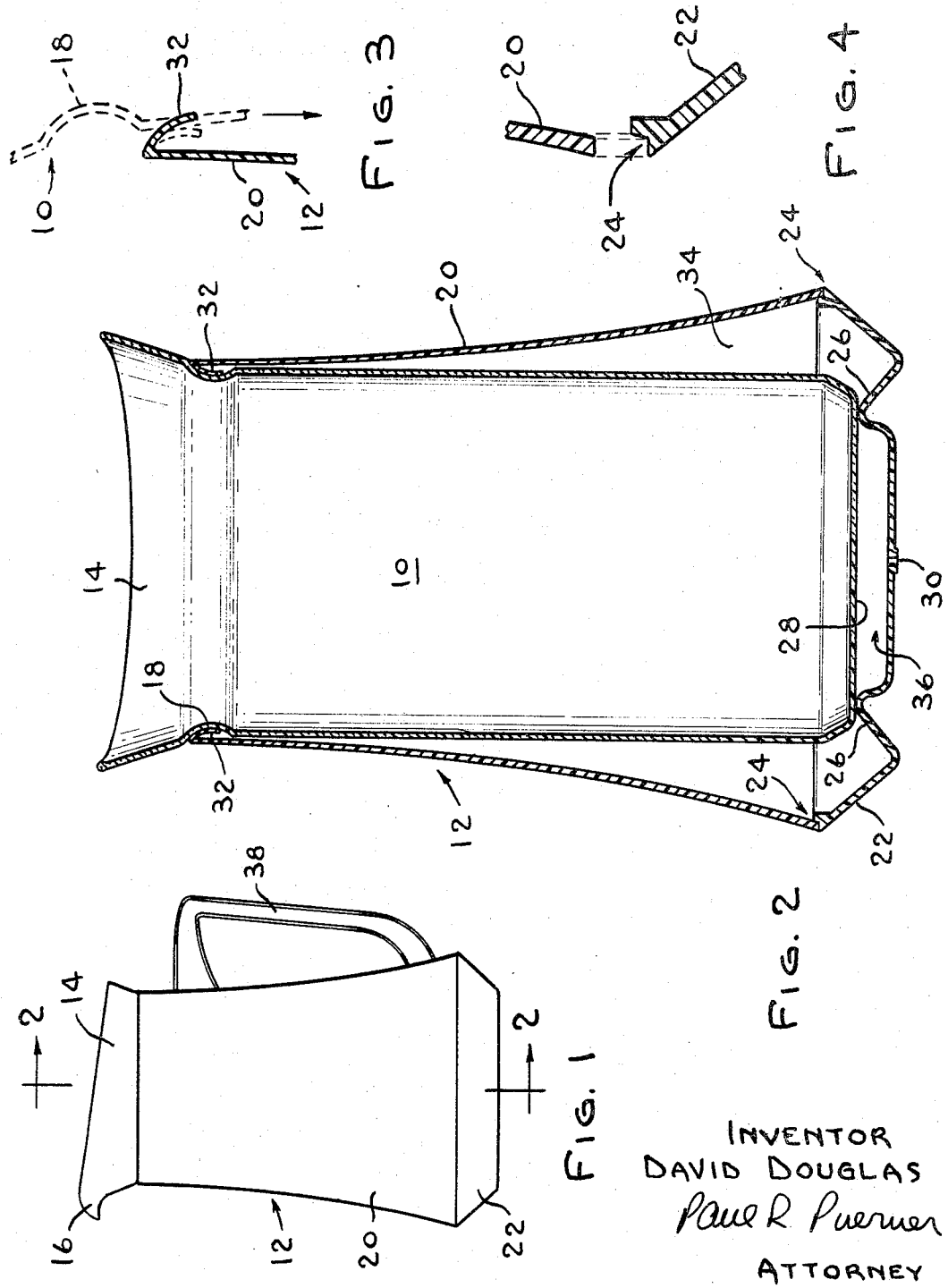

United States Patent Office 3,355,045
Patented Nov. 28, 1967

3,355,045
INSULATED BEVERAGE SERVER
David Douglas, 1119 Lincoln Blvd.,
Manitowoc, Wis. 54220
Filed Oct. 24, 1965, Ser. No. 504,339
2 Claims. (Cl. 215—13)

ABSTRACT OF THE DISCLOSURE

A beverage server comprised of a glass liner and an insulating jacket which is permanently fixed to the liner at its top portion by a lip formed by an inwardly and downwardly directed fold which engages a groove in the liner. The liner is supported at its bottom by ridges formed on the inside of the liner. A partial vacuum is maintained between the liner and the jacket. The beverage server is provided with a cover assembly having an outer cover member with a central opening and a removable plug mounted in such opening.

---

This invention relates to improvements in an insulated beverage server.

The object of this invention is to provide a beverage server having good insulating properties at a relatively low cost.

Another object is to provide a beverage server and cover design which is adapted for use as a coffee maker.

Another object is to provide a beverage server having the above characteristics which can be manufactured by a few easily performed steps.

The objects of this invention are attained by a beverage server comprising an inside liner member of glass having a plastic insulating jacket mounted thereon. The top portion of the glass liner is provided with a grooved neck and the top of the insulating plastic jacket is provided with a cooperating inwardly extending lip portion. To assemble the liner and jacket, the jacket member is first heated to allow the material in the top portion thereof to be stretched. The glass liner member is then forced into the jacket member past the inwardly extending lip until the lip registers in the groove on the liner. The air in the jacket member is forced out a vent opening in the bottom of the jacket. After the liner has been fully inserted in the jacket, the vent opening is sealed off. The parts are then allowed to cool causing the lip on the jacket to shrink into sealing engagement with the groove in the linear member. The seal thus produced is further enhanced by the partial vacuum created between the liner and the jacket as the air therein cools down to room temperature.

A specially designed cover assembly is provided for the beverage server. Such assembly includes an outer cover member having a central opening therein and a removable center plug member mounted in the central opening. This arrangement permits the insertion of a cone member in the server to facilitate the preparation of coffee by the steeping process.

Other objects and advantages will be pointed out in, or be apparent from, the description and claims, as will obvious modifications of the single embodiment shown in the drawings, in which:

FIG. 1 is a side elevation view of a beverage server made in accordance with this invention;

FIG. 2 is a vertical sectional view taken along line 2—2 of FIG. 1;

FIG. 3 is an enlarged fragmentary view of the neck portion of the jacket and glass liner as they appear during assembly of the unit;

FIG. 4 is an enlarged fragmentary sectional view of the plastic jacket showing the joint between the wall portion and the bottom portion of the jacket;

FIG. 5 is a top plan view of the beverage server with the cap assembly in place;

FIG. 6 is a fragmentary sectional view taken through the top portion of the beverage server with portions of the cover assembly broken away;

FIG. 7 is a view similar to FIG. 6 but showing the cover assembly in section;

FIG. 8 is a bottom plan view of the cover assembly; and

FIG. 9 is a side elevation view of the beverage server with parts broken away and with a cone member installed for brewing coffee.

Referring now to the drawings, FIGS. 1 and 2 show the beverage server of this invention without the cover assembly mounted therein. The beverage server is comprised of two basic parts, a glass liner 10 and an insulating plastic jacket 12. Glass liner 10 is provided with a flared upper portion 14 having a pouring spout 16 and a grooved neck portion 18 between the flared upper portion and the main body portion of the liner.

The plastic jacket 12 can be made of any suitable plastic material such as polypropylene. The plastic jacket is comprised of an outwardly flared wall portion 20 and a bottom portion 22 secured to the wall portion by a joint 24 as shown in detail in FIG. 4. The two portions are secured together by any suitable adhesive material.

The bottom portion 22 of the jacket is provided with a raised ring portion 26 dimensioned to accommodate the bottom 28 of the glass liner. The raised ring portion 26 it is noted makes only a line contact with the bottom of the glass liner and thus serves to minimize any conduction of heat either to or from the liquid in the glass liner. The bottom portion 22 of jacket 12 is also provided with a small central opening 30 in the center thereof, the significance of which will be described in detail hereinafter.

The topmost portion of wall 20 of the plastic jacket is provided with an inwardly extending lip portion 32 which is adapted for sealing engagement in the neck groove 18 of the glass liner to provide a watertight seal between the jacket and the liner. As illustrated, the lip 32 is formed by an inwardly and downwardly extending fold of the jacket material.

The liner and jacket assembly is manufactured by the following steps. First, the bottom 22 and wall 20 of the liner are assembled together. The jacket is then preheated in the area of lip 32 so that the opening formed by lip 32 will stretch as the glass liner is forced into the jacket by any suitable means such as an air cylinder operated ram. As the glass liner is forced into the plastic jacket the air inside the jacket will escape through vent hole 30 in bottom portion 22. As soon as the liner has been fully inserted into the jacket so that the bottom thereof rests on ring portion 26 the vent hole 30 is sealed off by applying heat externally thereto causing the plastic material to flow and close the vent hole.

As the parts cool the lip portion 32 will shrink causing it to produce a tight seal at the neck groove 18 of the glass liner. The result is a waterproof seal permitting the entire assembly to be placed in a dishwasher for example without any danger of getting water or other liquid trapped between the glass liner and the plastic jacket. Furthermore, by quickly sealing the vent hole 30 after insertion of the liner in the jacket the cooling of the heated air inside the jacket will create a slight vacuum therein which further aids in producing a tight seal at the neck groove 18.

The resulting assembly produces a beverage server having excellent insulating characteristics due to the enclosed air chambers 34 and 36 provided around the main body and bottom of the glass liner, respectively. Either hot or cold liquids can be placed in the liner and the temperature maintained for relatively long periods of time. Furthermore, as explained above the entire unit can be immersed in water for washing with no danger of leaking into the jacket at the joint between lip 32 and groove 18. The plastic jacket may be provided with a handle portion 38 molded into the jacket 12 as shown in FIG. 1.

Referring now to FIGS. 5, 6, 7, 8 and 9, the beverage server of this invention is provided with a specially designed cover assembly 39 comprising inner and outer cover members 40 and 42, respectively. Outer member 42 is adapted for mounting in the neck portion of the glass liner and is provided with a ring shaped top portion 44 having a depending flange 46. Flange 46 is provided with spaced groove portions 48 and 50 on the outer surface thereof which make frictional engagement with the groove portion 18 of liner 10. Such grooves enable the cover assembly 39 to be positioned in either the FIG. 6 or FIG. 7 position. In the FIG. 6 position the cover assembly serves to completely close off the top opening in the liner 12. In the FIG. 7 position the cover is raised to allow flow of liquid through the cutout portion 52 in flange 46.

As indicated above, the cover assembly further includes a removable center plug member 40 which fits into the outer member 42 as shown clearly in FIG. 7. The center member 40 is provided with a pair of ears 54 which are dimensioned to fit through cutout portions 56 in the outer member 42 to permit the center plug to be securely mounted in such member as shown in FIGS. 7 and 8. To assemble the two cover parts the center portion is inserted and then twisted a slight amount to a position such as shown in FIG. 8 wherein the ears 54 will prevent the center plug from coming loose.

The purpose of the removable center plug portion 40 is to allow the insertion of a cone member 58 as shown in FIG. 9. Such cone member 58 can be provided with a filter cone (not shown) into which coffee is placed and then hot water poured thereover to thus brew coffee in the beverage server. By mounting the cone 58 in the center opening normally occupied by center cover member 40, the cone will be supported at a higher level than if the entire cover assembly 39 were removed and the cone mounted in the flared top portion 14 of the liner. This, of course, permits a greater amount of liquid to be poured into the server without contacting the end of the cone.

Although but one embodiment of the present invention has been illustrated and described, it will be apparent to those skilled in the art that various changes and modifications may be made therein without departing from the spirit of the invention or from the scope of the appended claims.

I claim:
1. A beverage server comprising:
   a glass liner member having a grooved neck portion;
   an insulating jacket mounted on said liner and having an inwardly extending lip portion positioned in sealing engagement with said grooved neck portion of said liner, said insulating jacket member having a wall portion and a bottom spaced from the wall and bottom of said glass liner respectively; and
   a cover assembly for said glass liner, said cover assembly including an outer cover member having a central opening therein and a removable center plug member mounted in said central opening.

2. A beverage server according to claim 1 in which said outer cover member is comprised of a ring-shaped top portion having a depending flange thereon, said depending flange having a pair of spaced ridges thereon adapted to hold said outer cover member in said liner at two different elevations, said depending flange having a cutout portion through which liquid can flow when said outer cover member is positioned in its higher elevation position.

References Cited

UNITED STATES PATENTS

| 1,130,158 | 3/1915 | Fiedler. | |
| 1,520,118 | 12/1924 | Bultman | 215—13 |
| 2,832,493 | 4/1958 | Murphy. | |
| 2,859,085 | 11/1958 | Morrison | 215—12 |
| 3,110,408 | 11/1963 | Bramming | 215—13 |

FOREIGN PATENTS

| 1,081,633 | 5/1960 | Germany. |

DONALD F. NORTON, *Primary Examiner.*

JOSEPH R. LECLAIR, *Examiner.*